United States Patent
Yang et al.

(10) Patent No.: US 10,752,533 B2
(45) Date of Patent: Aug. 25, 2020

(54) MEMBRANE TREATMENT OF AMMONIA-CONTAINING WASTE WATER

(71) Applicant: DDP SPECIALTY ELECTRONIC MATERIALS US, INC., Collegeville, PA (US)

(72) Inventors: Cheng Yang, Shanghai (CN); Hong Su, Beijing (CN); Minjia Zhao, Shanghai (CN); Hugh Zhu, Beijing (CN)

(73) Assignee: DDP SPECIALTY ELECTRONIC MATERIALS US, INC., Collegeville, PA (US)

( * ) Notice: Subject to any disclaimer, the term of this patent is extended or adjusted under 35 U.S.C. 154(b) by 158 days.

(21) Appl. No.: 15/758,552

(22) PCT Filed: Oct. 30, 2015

(86) PCT No.: PCT/CN2015/093347
§ 371 (c)(1),
(2) Date: Mar. 8, 2018

(87) PCT Pub. No.: WO2017/070927
PCT Pub. Date: May 4, 2017

(65) Prior Publication Data
US 2018/0257965 A1    Sep. 13, 2018

(51) Int. Cl.
*C02F 9/04* (2006.01)
*C02F 1/44* (2006.01)
(Continued)

(52) U.S. Cl.
CPC ............... *C02F 9/00* (2013.01); *B01D 1/00* (2013.01); *B01D 3/145* (2013.01); *B01D 61/022* (2013.01);
(Continued)

(58) Field of Classification Search
CPC ..... C02F 9/00; C02F 1/20; C02F 1/048; C02F 1/66; C02F 1/441; C02F 1/444;
(Continued)

(56) References Cited

U.S. PATENT DOCUMENTS

| 4,156,645 A | 5/1979 | Bray |
| 4,214,994 A | 7/1980 | Kitano et al. |

(Continued)

FOREIGN PATENT DOCUMENTS

| CN | 1552638 | 12/2004 |
| CN | 104591423 A | 5/2015 |

(Continued)

OTHER PUBLICATIONS

Ming-Kai Hsieh, et al, Ammonia Stripping in Open-Recirculating Cooling Water Systems, Apr. 19, 2012, Environmental Progress & Sustainable Energy (vol. 32, No. 3 (Wiley Online Library (wileyonlinelibrary.com) DOI 10.1002/ep.11648, pp. 489-495.

*Primary Examiner* — David C Mellon
(74) *Attorney, Agent, or Firm* — Edward W. Black; Kenneth Crimaldi

(57) ABSTRACT

A method for treating waste water containing ammonia comprising the steps of: i) passing the waste water as a feed solution through a first RO membrane (24) to produce a first permeate stream (30) and a first reject stream (32), ii) adjusting the pH of the first reject stream (32) to >9, iii) passing the first reject stream (32) through a second RO membrane (26) to produce a second permeate stream (36) containing ammonia and a second reject stream (38), and iv) passing at least a portion of the second permeate stream (36) to a cooling tower (12) to evaporate at least a portion of the ammonia.

6 Claims, 1 Drawing Sheet

(51) Int. Cl.
*C02F 1/66* (2006.01)
*C02F 1/20* (2006.01)
*B01D 61/04* (2006.01)
*B01D 61/02* (2006.01)
*B01D 3/14* (2006.01)
*B01D 1/00* (2006.01)
*C02F 1/04* (2006.01)
*C02F 1/52* (2006.01)
*C02F 1/42* (2006.01)
*C02F 1/50* (2006.01)
*C02F 9/00* (2006.01)
*C02F 101/16* (2006.01)
*C02F 103/02* (2006.01)
*C02F 1/00* (2006.01)

(52) U.S. Cl.
CPC .......... *B01D 61/025* (2013.01); *B01D 61/04* (2013.01); *C02F 1/048* (2013.01); *C02F 1/20* (2013.01); *C02F 1/441* (2013.01); *C02F 1/66* (2013.01); *B01D 2311/04* (2013.01); *B01D 2311/06* (2013.01); *B01D 2311/08* (2013.01); *B01D 2311/18* (2013.01); *B01D 2311/2673* (2013.01); *B01D 2317/022* (2013.01); *B01D 2317/025* (2013.01); *C02F 1/001* (2013.01); *C02F 1/42* (2013.01); *C02F 1/444* (2013.01); *C02F 1/445* (2013.01); *C02F 1/50* (2013.01); *C02F 2001/5218* (2013.01); *C02F 2101/16* (2013.01); *C02F 2103/023* (2013.01); *C02F 2209/06* (2013.01); *C02F 2209/14* (2013.01); *C02F 2301/046* (2013.01); *C02F 2301/08* (2013.01); *C02F 2303/08* (2013.01); *C02F 2303/22* (2013.01)

(58) Field of Classification Search
CPC ........ C02F 1/001; C02F 2303/08; C02F 1/50; C02F 1/445; C02F 1/42; C02F 2303/22; C02F 2209/14; C02F 2209/06; C02F 2301/08; C02F 2301/046; C02F 2103/023; C02F 2101/16; C02F 2001/5218; C02F 1/04; B01D 1/00; B01D 3/145; B01D 61/025; B01D 61/022; B01D 61/04; B01D 2317/025; B01D 2311/2673; B01D 2311/04; B01D 2311/06; B01D 2311/18; B01D 2317/022; B01D 2311/08; B01D 2311/2653
See application file for complete search history.

(56) References Cited

U.S. PATENT DOCUMENTS

| | | |
|---|---|---|
| 4,277,344 A | 7/1981 | Cadotte |
| 4,795,559 A | 1/1989 | Shinjou et al. |
| 5,435,957 A | 7/1995 | Degen et al. |
| 5,538,642 A | 7/1996 | Solie |
| 5,670,053 A | 9/1997 | Collentro et al. |
| 5,919,026 A | 7/1999 | Appleton |
| 6,074,595 A | 6/2000 | Eisberg et al. |
| 6,156,680 A | 12/2000 | Goettmann |
| 6,165,303 A | 12/2000 | Darby et al. |
| 6,187,200 B1 | 2/2001 | Yamamura et al. |
| 6,299,772 B1 | 10/2001 | Huschke et al. |
| 6,878,278 B2 | 4/2005 | Mickols |
| 6,881,336 B2 | 4/2005 | Johnson |
| 7,048,855 B2 | 5/2006 | de la Cruz |
| 7,144,511 B2 | 12/2006 | Vuong |
| 7,875,177 B2 | 1/2011 | Haynes et al. |
| 7,951,295 B2 | 5/2011 | Larson et al. |
| 8,142,588 B2 | 3/2012 | McCollam |
| 8,496,825 B1 | 7/2013 | Jons et al. |
| 2007/0138093 A1* | 6/2007 | Bossler ............... B01D 61/022 210/639 |
| 2007/0272628 A1 | 11/2007 | Michols et al. |
| 2008/0264870 A1 | 10/2008 | Duke et al. |
| 2008/0295951 A1 | 12/2008 | Hiro et al. |
| 2008/0308504 A1 | 12/2008 | Hallan et al. |

FOREIGN PATENT DOCUMENTS

| | | |
|---|---|---|
| CN | 104609588 | 5/2015 |
| CN | 104812705 A | 7/2015 |
| DE | 19808433 A1 | 9/1999 |
| JP | 2006212526 A | 8/2006 |
| JP | 2014014738 | 1/2014 |
| WO | 9705945 A1 | 2/1997 |
| WO | 0144123 A1 | 6/2001 |
| WO | 2014083887 A1 | 6/2014 |

* cited by examiner

MEMBRANE TREATMENT OF AMMONIA-CONTAINING WASTE WATER

FIELD

The invention is directed toward membrane-based methods for treating waste water.

INTRODUCTION

Treatment and re-use of waste water from chemical processing is becoming an increasing focus of activity. Such waters include a variety of contaminates including scale forming salts, ammonia and other debris. While techniques for reducing ammonia are known, (e.g. microbial facilitated de-nitrification), new techniques are desired.

SUMMARY

The invention includes a system and method for treating waste water containing ammonia and comprises the steps of:
 i) passing the waste water as a feed solution through a first reverse osmosis (RO) membrane to produce a first permeate stream and a first reject stream,
 ii) adjusting the pH of the first reject stream to >9,
 iii) passing the first reject stream through a second RO membrane to produce to a second permeate stream containing ammonia and a second reject stream, and
 iv) passing at least a portion of the second permeate stream to a cooling tower to evaporate at least a portion of the ammonia.

In a preferred embodiment, the waste water includes blow down water from a cooling tower and the second permeate stream is used as makeup water for the cooling tower. A variety of embodiments are described.

BRIEF DESCRIPTION OF THE DRAWINGS

The figures are not to scale and include idealized views to facilitate description. Where possible, like numerals have been used throughout the figures and written description to designate the same or similar features.

DETAILED DESCRIPTION

The present invention finds particularly utility in connection with open recirculating (evaporative) cooling water systems. In such systems, water from a cooling tower passes through process equipment (heat load) requiring cooling and then returns through an evaporative unit (cooling tower or evaporative condenser) which cools the water that remains. Water is recirculated through the system with addition of sufficient freshwater makeup to balance the water loss to evaporation and waste water blow down bled from the system to control the chemical character of the recirculating water. In a preferred embodiment, the present invention also involves an ammonia-containing source of water which is a primary source of ammonia for the waste water to be treated. More specifically, the waste water containing ammonia (having a pH of less than 9) is passed as a feed solution through a first reverse osmosis (RO) membrane. At this pH, most (e.g. over 90%) of the ammonia present in the waste water is rejected by the first RO membrane. Thus, this first reject stream is more concentrated in ammonia. The pH of this first reject stream is then adjusted to over 9, more preferably more than 10 and passed through a second RO membrane. At this higher pH, the second RO membrane still rejects most of the dissolved solids and salts present. However, much of the "ammonia" is present as ammonia ($NH_3$) rather than ammonium ($NH_4^+$), and ammonia ($NH_3$) is poorly rejected by the RO membrane. In a preferred embodiment, at least a portion of the permeate stream from the second RO membrane ("second permeate stream") is introduced into an evaporative unit as makeup water. Upon introduction, the ammonia present in the second permeate stream is largely evaporated into the environment. The overall result is the re-use of waste water as makeup without undesired concentration of ammonia in the system. By contrast, the first permeate stream is preferably subject to different use, e.g. sent to a degasser.

Figure 1:
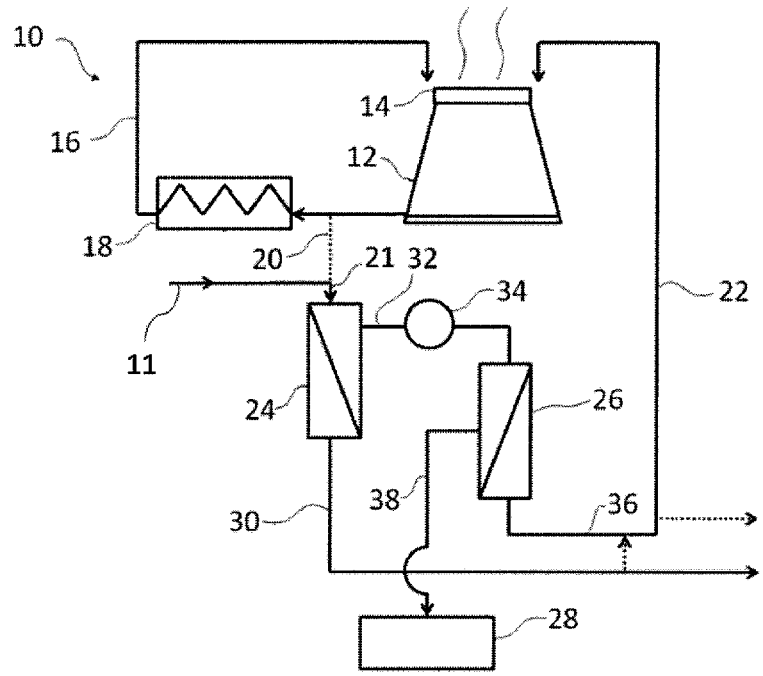
FIG. 1 is a schematic view of a first embodiment of the invention.

With reference to the embodiment of FIG. 1, a schematic illustration of an open recirculating cooling water system is generally shown at 10 including a source of water containing ammonia (11), a blow down line (20), a makeup line (22), and a cooling tower recirculation loop (16) including a heat load (18) and a cooling tower (12) with an evaporation vent (14). In the illustrated embodiment, the blow down line (20) is combined with an ammonia-containing source water (11). The combined waste water containing ammonia (21) is treated by at least two stages of RO membrane units, with the reject of an upstream unit (first RO membrane unit) (24) being subsequently treated by a downstream unit (second RO membrane unit) (26). While not shown, additional unit operations for treating the waste water may be included, (e.g. the introduction of chemical additives such as anti-scalants, biocides, reducing agent, corrosion prevention additives, filtration (media, cartridge, ultra filtration), and ion exchange). The system may further include an evaporator or condenser (28) for treating reject from the second RO membrane unit (26). This allows the system (10) to approach a near zero liquid discharge.

During operation, an ammonia-containing source water (11) is preferably combined with fluid from the blow down line (20) drawn from the water recirculation loop (16), e.g. from the bottom of cooling tower (12), heat load (18), etc. In this embodiment, the combined waste water containing ammonia is provided as the feed solution to the first RO membrane unit (24). The waste water preferably has a pH <9 (more preferably <8.5). The waste water is treated by passing through the first RO membrane (24) to produce a first permeate stream (30) and a first reject stream (32). The pH of the first reject stream is then adjusted to >9 (more preferably >10), preferably by way of the addition of base (e.g. NaOH, lime, etc.). A dosing pump (34) or similar means may be used for metering the addition of base. After pH adjustment, the first reject stream (32) is passed through the second RO membrane (26) to produce to a second permeate stream (36) and a second reject stream (38). The second reject stream (38) may optionally be treated by evaporation, forward osmosis, or crystallization (28). At least a portion of the second permeate stream (36) is returned to the cooling tower (12) as makeup water. Portions of the first permeate stream (30) may also be used as makeup or used for other purposes. Upon introduction into the cooling tower (12), at least a portion of the ammonia present in the second permeate stream (36) is evaporated and vented (14) from the cooling tower (12). Prior to introduction into the cooling tower, the concentration of ammonia in the second permeate stream (36) is greater than both the average concentration of ammonia in the cooling tower recirculation loop (16) and the ammonia concentration in the feed solution to the first RO unit. More preferably, the concentration of ammonia in the second permeate stream (36) is at least 10× the concentration of ammonia in the first permeate stream (30). Representative ammonia concentrations present in the cooling tower recirculation loop (16) are from 0.1 ppm to 5 ppm. Representative ammonia concentrations in the first (32) and second permeate stream (36) are from 0 ppm to 1 ppm and 0.5 ppm to 20 ppm, depending with the feed wastewater composition.

Figure 2:
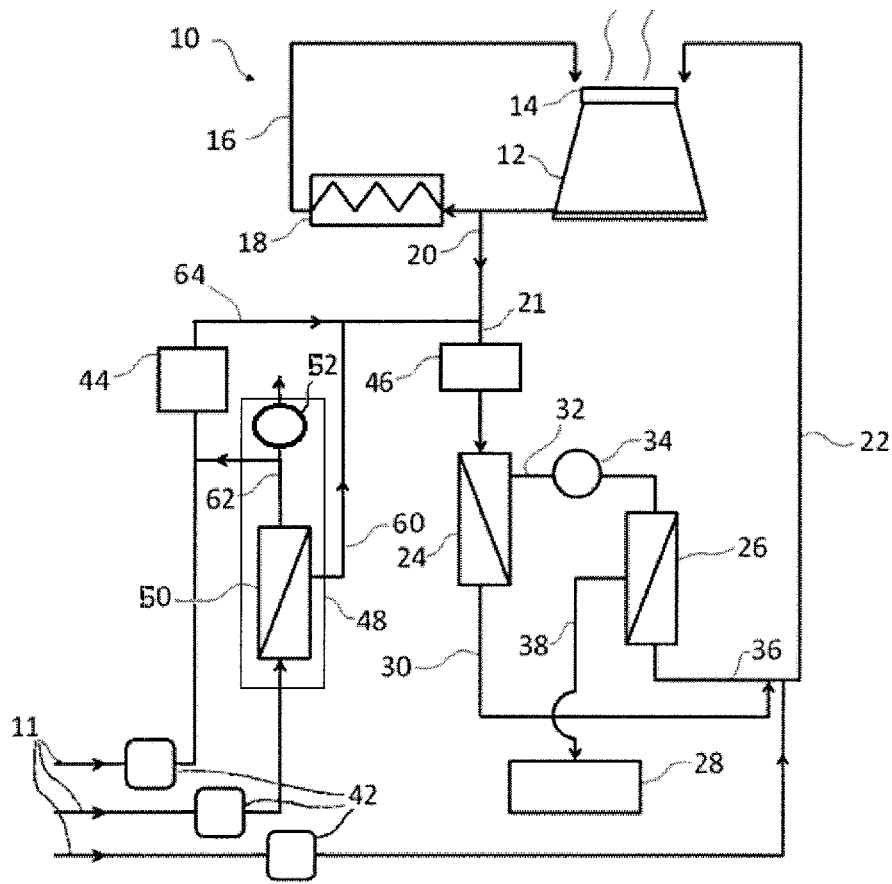
FIG. 2 is a schematic view of a second embodiment of the invention.

FIG. 2 shows a schematic view of a second embodiment of the invention. In this embodiment, an ammonia-containing source water (11), such as from surface water, enters a industrial plant. Following optional pre-treatment steps (42), the source water may be provided to the industrial process (44), a demineralization station (48), and/or to a cooling tower (12) through the makeup line (22). In preferred embodiments, the demineralization station (48) may include a RO system (50). Permeate (60) from RO in the demineralization station (48) may be used for a boiler (52) or the industrial process (44). A combined waste water containing ammonia (21) may comprise a concentrate stream (62) from RO in the demineralization station, waste streams (64) from the industrial process (42), and fluid from the cooling water blow down line (20). In particular, the concentrate stream (62) from the demineralization station (48) may have levels of ammonia. The waste water containing ammonia (21) may undergo additional pretreatment (46) before becoming the feed to a first reverse membrane, and passing through the first RO membrane (24) to produce a first permeate stream (30) and a first reject stream (32). The pH of the first reject stream is adjusted to >9 (more preferably >10), preferably by way of the addition of base (e.g. NaOH, lime, etc.). A dosing pump (34) or similar means may be used for metering the addition of base. After pH adjustment, the first reject stream (32) is passed through the second RO membrane (26) to produce to a second permeate stream (36) and a second reject stream (38). The second reject stream (38) may optionally be treated by evaporation or crystallization (28). At least a portion of the second permeate stream (36) is returned to the cooling tower (12) as makeup water.

The present invention includes the use of RO membranes. While various membrane configurations may be used, (e.g. hollow fiber, tubular, plate and frame), spiral wound modules ("elements") are preferred. RO membranes are relatively impermeable to virtually all dissolved salts and typically reject more than about 95% of salts having monovalent ions such as sodium chloride. RO membranes also typically reject more than about 95% of inorganic molecules as well as organic molecules with molecular weights greater than approximately 100 Daltons. Nanofiltration (NF) membranes are more permeable than RO membranes and typically reject less than about 95% of salts having monovalent ions while rejecting more than about 50% (and often more than 90%) of salts having divalent ions—depending upon the species of divalent ion. NF membranes also typically reject particles in the nanometer range as well as organic molecules having molecular weights greater than approximately 200 to 500 Daltons. Unless otherwise stated, the term "REVERSE OSMOSIS" is used to encompass both RO(REVERSE OSMOSIS) and nanofiltration (NF).

Spiral wound module construction has been described in detail elsewhere (U.S. Pat. Nos. 6,881,336, 8,142,588 and 8,496,825). Spiral wound membrane modules may be formed by winding one or more membrane envelopes and optional feed channel spacer sheet(s) ("feed spacers") about a permeate collection tube. Each membrane envelope preferably comprises two substantially rectangular membrane sheets surrounding a permeate channel spacer sheet ("permeate spacer"). This sandwich-type structure is secured together, e.g. by sealant, along three edges while the fourth edge abuts the permeate collection tube. The permeate spacer is in fluid contact with openings passing through the permeate collection tube. An outer housing of the element may be constructed from a variety of materials including stainless steel, tape and PVC material. Additional details regarding various components and construction of spiral wound elements are provided in the literature, see for example: U.S. Pat. No. 5,538,642 which describes a technique for attaching a permeate spacer to a permeate collection tube, U.S. Pat. No. 7,951,295 which describes trimming operations and the use of a UV adhesive for forming a insertion point seal, U.S. Pat. No. 7,875,177 which describes an applicable leaf packet.

The membrane sheet is not particularly limited and a wide variety of materials may be used, e.g. cellulose acetate materials, polysulfone, polyether sulfone, polyamides, polyvinylidene fluoride, etc. A preferred membrane sheet is a composite structure having a discriminating layer formed by interfacially polymerization. A typical composite hyperfiltration membrane includes a backing layer (back side) of a nonwoven backing web (e.g. a non-woven fabric such as polyester fiber fabric available from Awa Paper Company), a middle layer comprising a porous support having a typical thickness of about 25-125 µm and top discriminating layer (front side) comprising a thin film polyamide layer having a thickness typically less than about 1 micron, e.g. from 0.01 micron to 1 micron but more commonly from about 0.01 to 0.1 µm. The backing layer is not particularly limited but preferably comprises a non-woven fabric or fibrous web mat including fibers which may be orientated. Alternatively, a woven fabric such as sail cloth may be used. Representative examples are described in U.S. Pat. Nos. 4,214,994; 4,795,559; 5,435,957; 5,919,026; 6,156,680; U.S. 2008/0295951 and U.S. Pat. No. 7,048,855. The porous support is typically a polymeric material having pore sizes which are of sufficient size to permit essentially unrestricted passage of permeate but not large enough so as to interfere with the bridging over of a thin film polyamide layer formed thereon. For example, the pore size of the support preferably ranges from about 0.001 to 0.5 µm. Non-limiting examples of porous supports include those made of: polysulfone, polyether sulfone, polyimide, polyamide, polyetherimide, polyacrylonitrile, poly(methyl methacrylate), polyethylene, polypropylene, and various halogenated polymers such as polyvinylidene fluoride. The discriminating layer is preferably formed by an interfacial polycondensation reaction between a polyfunctional amine monomer and a polyfunctional acyl halide monomer upon the surface of the microporous polymer layer as described in U.S. Pat. Nos. 4,277,344 and 6,878,278.

While modules are available in a variety of sizes, one common industrial RO module is available with a standard 8 inch (20.3 cm) diameter and 40 inch (101.6 cm) length. For a typical 8 inch diameter module, 26 to 30 individual membrane envelopes are wound around the permeate collection tube (i.e. for permeate collection tubes having an outer diameter of from about 1.5 to 1.9 inches (3.8 cm-4.8)).

One or more modules are arranged within a pressure vessel. The pressure vessels used in the present invention are not particularly limited but preferably include a solid structure capable of withstanding pressures associated with operating conditions. The vessel structure preferably includes a chamber having an inner periphery corresponding to that of the outer periphery of the spiral wound modules to be housed therein. The length of the chamber preferably corresponds to the combined length of the elements to be sequentially (axially) loaded, e.g. 1 to 8 elements, see U.S. 2007/0272628 to Mickols. The pressure vessel may also include one or more end plates that seal the chamber once loaded with modules. The vessel further includes at least one fluid inlet and outlet preferably located at opposite ends of the chamber. The orientation of the pressure vessel is not particularly limited, e.g. both horizontal and vertical orientations may be used. Examples of applicable pressure vessels, module arrangements and loading are described in: U.S. Pat. Nos. 6,074,595, 6,165,303, 6,299,772 and U.S. 2008/0308504. Manufacturers of pressure vessels include Pentair of Minneapolis Minn., Bekaert of Vista Calif. and Bel Composite of Beer Sheva, Israel. An individual pressure vessel or a group of vessels working together, each equipped with one or more modules, are commonly referred to as a "train" or "pass." The vessel(s) within the pass may be arranged in one or more stages, wherein each stage contains one or more vessels operating in parallel with respect to a feed fluid. Multiple stages are arranged in series, whereby the concentrate fluid from an upstream stage is used as feed fluid for the downstream stage, while the permeate from each stage may be collected without further reprocessing within the pass. Multi-pass hyperfiltration systems are constructed by interconnecting individual passes along a fluid path way as described in: U.S. Pat. Nos. 4,156,645, 6,187,200 and 7,144,511.

In a preferred embodiment, the first RO membrane unit includes FILMTEC BW30XFR-400/34i modules serially connected within a common pressure vessel and the second RO membrane unit includes FILMTEC BW30XFR-400/34i, SW30HRLE-370/34i or SEAMAXX serially connected in common pressure vessel. The pressure vessels may be connected using standard pipes, values, etc. Waste water may be pressurized using conventional pumps.

The first RO unit is preferably operated at a pressure from 5 Bar to 35 Bar and recovery rate of from 60% to 85%. The second RO unit is preferably operated at a pressure from 15 Bar to 80 Bar and recovery rate of from 60% to 95%.

While reference has been made to ammonia ($NH_3$), it will be understood that depending upon the pH, different amounts of ammonium ($NH_4^+$) will also be present. As such, except when designated as "ammonia ($NH_3$)", the present use of the term "ammonia" or "ammonia class" will be understood to also include "ammonium."

Many embodiments of the invention have been described and in some instances certain embodiments, selections, ranges, constituents, or other features have been characterized as being "preferred." Such designations of "preferred" features should in no way be interpreted as an essential or critical aspect of the invention. The entire content of each of the aforementioned patents and patent applications are incorporated herein by reference.

What is claimed is:

1. A method for treating waste water containing ammonia and having a pH of less than 8.5 comprising the steps of:
   i) passing the waste water as a feed solution through a first reverse osmosis membrane to produce a first permeate stream and a first reject stream,
   ii) adjusting the pH of the first reject stream to >9,
   iii) passing the first reject stream through a second reverse osmosis membrane to produce a second permeate stream containing ammonia and a second reject stream, and
   iv) passing at least a portion of the second permeate stream to a cooling tower to evaporate at least a portion of the ammonia.

2. The method of claim 1 wherein said waste water containing ammonia comprises waste streams from an industrial process, fluid from a cooling water blow down line or a combination thereof.

3. The method of claim 1 wherein the concentration of ammonia in the second permeate stream is greater than the concentration of ammonia in the feed solution to the first reverse osmosis membrane.

4. The method of claim 1 wherein the concentration of ammonia in the second permeate stream is at least 10× the concentration of ammonia in the first permeate stream.

5. The method of claim 1 wherein the pH of the first reject stream is adjusted to >10.

6. The method of claim 1 wherein the second reject stream is further treated by evaporation or crystallization.

* * * * *